United States Patent
Michishita et al.

(10) Patent No.: US 10,084,305 B2
(45) Date of Patent: Sep. 25, 2018

(54) ELECTRONIC CIRCUIT DEVICE

(71) Applicant: DENSO CORPORATION, Kariya, Aichi-pref. (JP)

(72) Inventors: Yusuke Michishita, Kariya (JP); Nobuo Segawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 15/073,726

(22) Filed: Mar. 18, 2016

(65) Prior Publication Data
US 2017/0005463 A1 Jan. 5, 2017

(30) Foreign Application Priority Data
Jun. 30, 2015 (JP) ................ 2015-130930

(51) Int. Cl.
*H02H 5/04* (2006.01)
*H02M 7/00* (2006.01)
*H02P 29/68* (2016.01)
*H02H 7/122* (2006.01)

(52) U.S. Cl.
CPC ............ *H02H 5/04* (2013.01); *H02H 7/1225* (2013.01); *H02M 7/00* (2013.01); *H02P 29/68* (2016.02)

(58) Field of Classification Search
CPC ................ H02H 5/04; H01L 2924/00; H01L 2924/0002
USPC ........................................ 361/103
See application file for complete search history.

(56) References Cited

U.S. PATENT DOCUMENTS

| | | | | |
|---|---|---|---|---|
| 8,371,750 B2* | 2/2013 | Hamanaka | ............... | G01K 7/01 374/110 |
| 8,922,152 B2* | 12/2014 | Kawamura | ........ | H03K 17/0828 180/65.21 |
| 2003/0076233 A1* | 4/2003 | Sato | ........................ | H02M 7/00 340/679 |
| 2004/0201938 A1* | 10/2004 | Watanabe | .......... | H03K 17/0822 361/103 |
| 2005/0108929 A1* | 5/2005 | Hirahara | .................. | A01C 1/06 47/1.01 R |
| 2005/0197799 A1 | 9/2005 | Kamezawa et al. | | |
| 2007/0201176 A1* | 8/2007 | Yokai | ...................... | H02M 1/32 361/103 |
| 2008/0290506 A1 | 11/2008 | Aoki et al. | | |
| 2012/0063187 A1 | 3/2012 | Sato et al. | | |

(Continued)

FOREIGN PATENT DOCUMENTS

JP 2010-056333 A 3/2010
JP 2011-182528 A 9/2011

*Primary Examiner* — Dharti Patel
(74) *Attorney, Agent, or Firm* — Posz Law Group, PLC

(57) ABSTRACT

An electronic circuit device comprises an output part, which includes at least three phase parts and a first temperature sensor and a second temperature sensor, which output detection signals corresponding to temperatures of the output part. Each phase part includes two high-side and low-side switching elements. The first temperature sensor is located at a position between the first phase part and the second phase part. The second temperature sensor is located at a position between the second phase part and the third phase part. The electronic circuit device further comprises a control circuit part, which specifies a phase part of overheat among the phase parts based on the detection signals of the first temperature sensor and the second temperature sensor.

11 Claims, 7 Drawing Sheets

(56) References Cited

U.S. PATENT DOCUMENTS

2014/0104902 A1\* 4/2014 Casares .................... H02H 3/44
363/56.01

\* cited by examiner

| TEMPERATURE STATE | | | | SENSOR OUTPUT | | |
|---|---|---|---|---|---|---|
| FIRST | SECOND | THIRD | FOURTH | FIRST SENSOR | SECOND SENSOR | THIRD SENSOR |
| OVER -HEAT | | | | Vth1<V31 | Vth1>V32 | Vth1>V33 |
| | OVER -HEAT | | | Vth1<V31 | Vth1<V32 | Vth1>V33 |
| | | OVER -HEAT | | Vth1>V31 | Vth1<V32 | Vth1<V33 |
| | | | OVER -HEAT | Vth1>V31 | Vth1>V32 | Vth1<V33 |
| OVER -HEAT | OVER -HEAT | OVER -HEAT | OVER -HEAT | Vth2<V31 | Vth2<V32 | Vth2<V33 |

ELECTRONIC CIRCUIT DEVICE

CROSS REFERENCE TO RELATED APPLICATION

This application is based on Japanese patent application No. 2015-130930 filed on Jun. 30, 2015, the content of which is incorporated herein by reference.

TECHNICAL FIELD

The present disclosure relates to an electronic circuit device, which includes an output part and temperature sensors.

BACKGROUND ART

US 2012/0063187 A1 (JP 2012-65431 A) discloses one example of inverter circuit devices, which includes an output part and temperature sensors. The Inverter circuit device has a U-phase part, a V-phase part and a W-phase part, which correspond to each phase of a motor (U-phase, V-phase and W-phase). Each phase part has a switching element of a high-side arm and a switching element of a low-side arm. The inverter circuit device has a temperature detection circuit (temperature sensor) in an area, which overlaps an area of mounting of one of the high-side arm and the low-side arm.

In the inverter circuit device described above, however, the temperature sensor is located at either one of the high-side arm and the low-side arm of each phase part. The inverter circuit device thus needs the same number of temperature sensors as the number of phase parts and hence costs high.

SUMMARY

It is therefore an to provide an electronic circuit device, which is capable of specifying a phase part of overheating with less number of temperature sensors.

According to one aspect, an electronic circuit device comprises an output part, temperature sensors and a control circuit part. The output part includes at least three phase parts, each of which is formed of two switching elements connected in series to turn on and off. The temperature sensors output detection signals corresponding to temperatures of the output part. The temperature sensors are less by one in number than the phase parts and located between adjoining two of the phase parts. The control circuit part specifies a phase part of overheat among all of the phase parts based on all of the detection signals.

DETAILED DESCRIPTION OF THE EMBODIMENT

Figure 1:
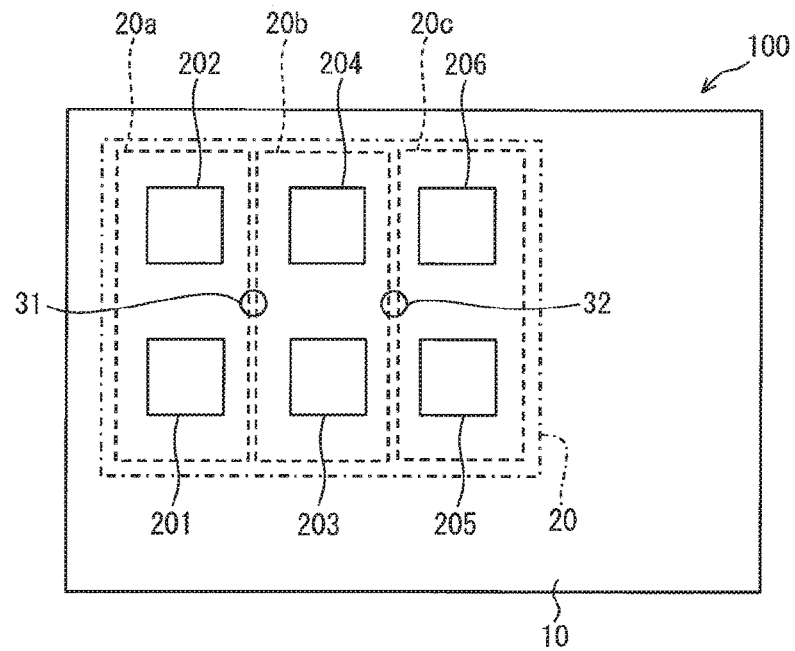
FIG. 1 is a plan view showing a general configuration of an electronic circuit device according to an embodiment.

An electronic circuit device will be described with reference to one embodiment and its plural modifications shown in the drawings. In each embodiment and modifications, same structural parts are designated with the same reference numerals to simplify the description.

Embodiment

Figure 2:
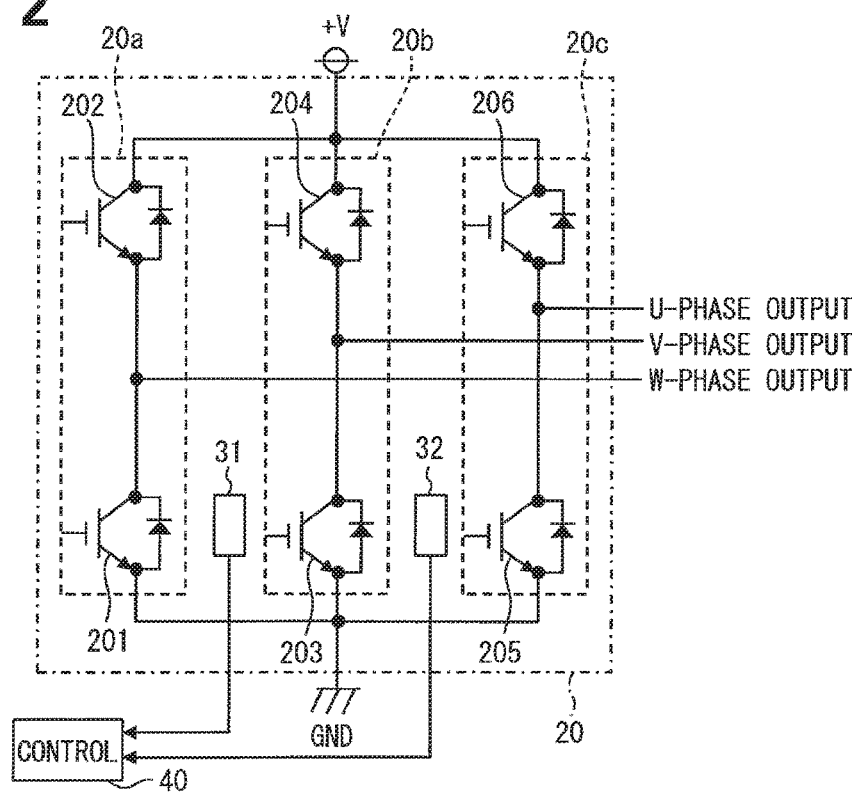
FIG. 2 is a circuit diagram showing a general configuration of the electronic circuit device according to the embodiment.

Referring first to FIG. 1 and FIG. 2, an electronic circuit device 100 includes a three-phase inverter circuit. For example, the electronic circuit device 100 is mounted in a vehicle and configured to supply power to a motor for travel and motors for various controllers (accessory devices).

As shown in FIG. 1 and FIG. 2, the electronic circuit device 100 is formed of an output part 20, a first temperature sensor 31 and a second temperature sensor 32 on a mounting substrate 10. The electronic circuit device 100 is further provided with a control circuit part 40 as shown in FIG. 2.

The mounting substrate 10 is a circuit board, on which wiring of conductor is formed on an insulating board such as resin and ceramics. The mounting substrate 10 is provided with lands as a part of the wiring to be connected electrically and mechanically with circuit elements mounted on itself.

The output part 20 includes a U-phase part 20a, a V-phase part 20b and a W-phase part 20c. The first phase part 20a, the second phase part 20b and the third phase part 20c are connected in parallel one another as shown in FIG. 2. The first phase part 20a, the second phase part 20b and the third phase part 20c are occasionally referred to as three phases collectively. Further, each of the first phase part 20a, the second phase part 20b and the third phase part 20c is occasionally referred to as a phase simply.

The first phase part 20a is an output part to the U-phase of the motor. The first phase part 20a Includes a first switching element 201 and a second switching element 202 as circuit elements mounted on the mounting substrate 10. The first switching element 201 and the second switching element 202 are connected in series between a power source +V and ground GND as shown in FIG. 2. The first phase part 20a thus includes the first switching element 201 and the second switching element 202 as the switching elements of a low-side arm and a high-side arm, respectively. The low-side arm and the high-side arm are at a high-potential side and a low-potential side, respectively.

The first switching element 201 is a discrete component, in which an insulated-gate bipolar transistor (IGBT) and a free-wheeling diode (FWD) are integrated, for example. Each of the second switching element 202 to sixth switching element 206 also has the same configuration as the first switching element 201.

The second phase part 20b is an output part to the V-phase of the motor. The second phase part 20b includes a third switching element 203 and a fourth switching element 204 as the switching elements of the low-side arm and the high-side arm, respectively. The second phase part 20b is configured similarly to the first phase part 20a and hence not described in detail.

The third phase part 20c is an output part to the W-phase of the motor. The third phase part 20c includes a fifth switching element 205 and a sixth switching element 206 as the switching elements of the low-side arm and the high-side arm, respectively. The third phase part 20c is also configured similarly to the first phase part 20a and hence not described in detail.

The first switching element 201, the third switching element 203 and the fifth switching element 205 are switching elements provided at the low-sides. The second switching element 202, the fourth switching element 204 and the sixth switching element 206 are switching elements provided at the high-sides.

The electronic circuit device 100 is thus formed of six switching elements 201 to 206. The electronic circuit device 100 is a three-phase output circuit, which includes series circuits of three phases. Each of the first switching element 201 to the sixth switching element 206 is mounted on a same surface of the mounting substrate 10. The electronic circuit device 100 may be provided with filler resin, which covers all of the first switching element 201 to the sixth switching element 206 and an area of mounting of the first switching element 201 to the sixth switching element 206 on the mounting substrate 10. The filler resin may be resin mold formed by compression method or transfer method using a die.

The first switching element 201 to the sixth switching element 206 are arranged on the mounting substrate 10 as follows. The following arrangement is one example and not limitative.

Each of the first switching element 201 and the second switching element 202 has a rectangular or square shape in plane having four side faces as shown in FIG. 1. The first switching element 201 is arranged such that its one side surface (top side in FIG. 1) faces one side surface of the second switching element 202 (bottom side in FIG. 1). Each of the first switching element 201 and the second switching element 202 is arranged such that its two side surfaces are on two parallel imaginary lines. Thus the first switching element 201 and the second switching element 202 are arranged along one imaginary straight line.

The third switching element 203 and the fourth switching element 204 also have the same shapes and the positional relations similar to those of the first switching element 201 and the second switching element 202. The fifth switching element 205 and the sixth switching element 206 also have the same shapes and the positional relations similar to those of the first switching element 201 and the second switching element 202.

Each phase part 20a to 20c are arranged in parallel one another, that is, side by side. The first switching element 201 is arranged such that its one side surface faces one side surface of the third switching element 203. The third switching element 203 is arranged such that its other side surface faces one side surface of the fifth switching element 205. The second switching element 202 is arranged such that its one side surface faces one side surface of the fourth switching element 204. The fourth switching element 204 is arranged such that its other side surface faces one side surface of the sixth switching element 206. Each of the first switching element 201, the third switching element 203 and the fifth switching element 205 is arranged such that its two side surfaces are on two parallel imaginary straight lines. Each of the second switching element 202, the fourth switching element 204 and the sixth switching element 206 is arranged such that its two side surfaces are on two parallel imaginary straight lines. As described above, the first switching element 201 to the sixth switching element 206 are arranged in a shape of two by three (2×3). The switching elements in each of the phase parts 20a to 20c are arranged in a direction perpendicular to a direction of arrangement of the phase parts 20a to 20c.

The first temperature sensor 31 and the second temperature sensor 32 are sensors for detecting temperatures of each phase part 20a to 20c. That is, the first temperature sensor 31 and the second temperature sensor 32 output detection signals as detection results, which correspond to temperatures developed as a result of on-off operations of the first switching element 201 to the sixth switching element 206. The first temperature sensor 31 and the second temperature sensor 32 output the detection signals to the control circuit part 40.

The electronic circuit device 100 is provided with only two temperature sensors 31 and 32 as temperature sensors for detecting temperature of each phase part 20a to 20c. The number of the temperature sensors 31 and 32 is less than three phases of the first phase part 20a, the second phase part 20b and the third phase part 20c. Thus the electronic circuit device 100 is configured to form an example that the number of phases "n" of the output part 20 is n=3 and the number of the temperature sensors "m" is m=n−1. That is, in the electronic circuit device 100, "n−1" pieces of temperature sensors are arranged between two adjoining phase parts among "n" phase parts. "n" is a natural number equal to or larger than 3.

The first temperature sensor 31 and the second temperature sensor 32 are mounted on the same surface of the mounting substrate 10 as the first switching element 201 to the sixth switching element 206 are mounted. The first temperature sensor 31 is located at a position sandwiched between the first phase part 20a and the second phase part 20b. The second temperature sensor 32 is located at a position sandwiched between the second phase part 20b and the third phase part 20c. Since the first temperature sensor 31 and the second temperature sensor 32 are located at different positions, the sensors 31 and 32 output detection signals indicating different values from each other.

Specifically, the first temperature sensor 31 is located at a position, which is distanced equally from the first switching element 201 to the fourth switching element 204. That is, the first temperature sensor 31 is located at a center of an area surrounded by the first switching element 201 to the fourth switching element 204. This area is defined by corners of the first switching element 201 and the fourth switching element 204 closest to each other and corners of the second switching element 202 and the third switching element 203 closest to each other. That is, the first temperature sensor 31 is located at a position which is equally distanced from the closest corners of the first switching element 201 to the fourth switching element 204. Thus the first temperature sensor 31 is located at a position with equal distances to all of the switching elements 201 to 204 in two phase parts 20a and 20b, which are adjoining to the first temperature sensor 31.

The second temperature sensor 32 is located at a position, which is distanced equally from the third switching element 203 to the sixth switching element 206. That is, the second temperature sensor 32 is located at a center of an area surrounded by the third switching element 203 to the sixth switching element 206. This area is defined by corners of the third switching element 203 and the sixth switching element 206 closest to each other and corners of the fourth switching element 204 and the fifth switching element 205 closest to each other. That is, the second temperature sensor 32 is located at a position which is equally distanced from the closest corners of the third switching element 203 to the sixth switching element 206. Thus the second temperature sensor 32 is located at a position with equal distances to all the switching elements 203 to 206 in two phase parts 20b and 20c, which are adjoining to the first temperature sensor 31.

The control circuit part 40 includes a microcomputer and the like, for example. The control circuit part 40 is a part, which controls the switching elements 202 to 206 and more particularly switches over the on-state and the off-state of each switching element 202 to 206 to drive the motor. That is, the control circuit part 40 drives each switching element 202 to 206 to perform a switching operation to drive the motor. The switching operation is an on-off operation.

The control circuit part 40 further specifies an overheated phase part among the first phase part 20a, the second phase part 20b and the third phase part 20c based on the detection signals outputted by the first temperature sensor 31 and the second temperature sensor 32. That is, the control circuit part 40 specifies the overheated phase part based on the detection signals outputted from the first temperature sensor 31 and the second temperature sensor 32 while driving each switching element 201 to 206 to perform the switching operation. The control circuit part 40 thus checks which one of the first phase part 20a, the second phase part 20b and the third phase part 20c overheats.

Upon detection of overheat, the control circuit part stops the switching operations of all the switching elements 201 to 206.

The control circuit part 40 checks which phase overheats by comparing the detection signals with predetermined first threshold value Vth1 and second threshold value Vth2 stored in a memory of the microcomputer. The first threshold value Vth1 is set to a value, which the detection signals do not exceed when the switching elements 201 to 206 do not overheat. The second threshold value Vth2 is set to a value, which is higher than the first threshold value Vth1 and which the detection signals do not exceed unless both of the first phase part 20a and the second phase part 20b sandwiching the first temperature sensor 31 or both of the second phase part 20b and the third phase part 20c sandwiching the second temperature sensor 32 overheat.

The processing operation of the control circuit part 40 will be described next with reference to FIG. 3 to FIG. 6, in which the detection signals of the first temperature sensor 31 and the second temperature sensor 32 are indicated as V31 and V32 and assumed to vary with detected temperatures, respectively. The control circuit part 40 drives the switching elements 201 to 206 to start respective switching operations from the non-switching operation states when the motor is driven. Each switching element 201 to 206 occasionally overheats because of failure while performing the switching operation. That is, each switching element 201 to 206 occasionally generates heat in excess of a permissible range. The first temperature sensor 31 and the second temperature sensor 32 responsively output the detection signals, which vary with overheating. When the detection signal exceeds the first threshold value Vth1, the control circuit part 40 detects the overheating and stops the switching operations of all the switching elements 201 to 206. When both of the first phase part 20a and the second phase part 20b sandwiching the temperature sensor 31 overheat, the control circuit part 40 sets a detection delay period DLY, with which the overheating transfers to the temperature sensor 31 and the detection signal of the first temperature sensor 31 exceeds the second threshold value Vth2. When both of the second phase part 20b and the third phase part 20c sandwiching the temperature sensor 32 overheat, the control circuit part 40 similarly sets the detection delay period DLY, with which the overheating transfers to the temperature sensor 32 and the detection signal of the second temperature sensor 32 exceeds the second threshold value Vth2.

It is not likely that only two of the three phases of the electronic circuit device 100 simultaneously fail. Accordingly, in the present embodiment, two overheat cases are assumed. Only one of the three phases is assumed to fail in one overheat case and all of the three phases are assumed to fall in the other overheat case.

Since the first temperature sensor 31 is located at the position sandwiched by the first phase part 20a and the second phase part 20b, it is more affected by heat generation of the first phase part 20a and the second phase part 20b than by heat generation of the third phase part 20c. As a result, the first temperature sensor 31 tends to output the detection signal V31, which corresponds to heat generation of the first phase part 20a and the second phase part 20b more than heat generation of the third phase part 20c.

Since the second temperature sensor 32 is located at the position sandwiched by the second phase part 20b and the third phase part 20c, it is more affected by heat generation of the second phase part 20b and the third phase part 20c than by heat generation of the first phase part 20a. As a result, the second temperature sensor 32 tends to output the detection signal V32, which corresponds to heat generation of the second phase part 20b and the third phase part 20c more than heat generation of the first phase part 20a.

Figure 3:
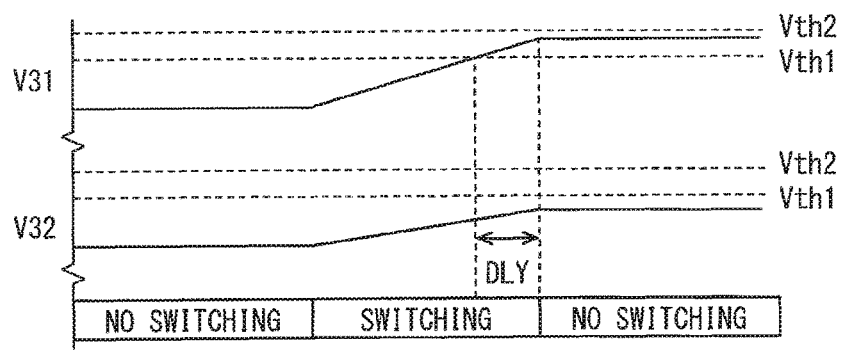
FIG. 3 is a time chart showing a detection result of each temperature sensor and a processing operation of a control circuit part in a case of overheating of a U-phase in the embodiment.

For this reason, when the detection signal V31 of the first temperature sensor 31 exceeds the first threshold value Vth1 but the detection signal V32 of the second temperature sensor 32 does not exceed the first threshold value Vth1 as shown in FIG. 3, the control circuit part 40 determines that the first phase part 20a overheats. The control circuit part 40 determines that at least one of the first switching element 201 and the second switching element 202 overheats. The control circuit part 40 then stops the switching operations of all the switching elements 201 to 206.

Figure 4:
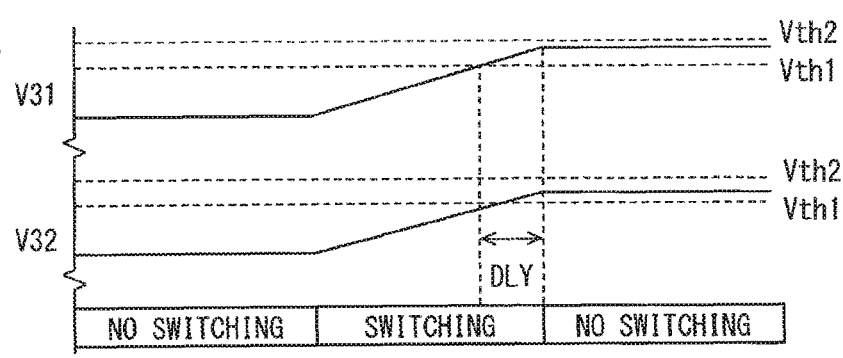
FIG. 4 is a time chart showing a detection result of each temperature sensor and a processing operation of the control circuit part in a case of overheating of a V-phase in the embodiment.

When the detection signals V31 and V32 of both of the first temperature sensor 31 and the second temperature sensor 32 exceed the first threshold value Vth1 but do not exceed the second threshold value Vth2 as shown in FIG. 4, the control circuit part 40 determines that the second phase part 20b overheats. The control circuit part 40 determines that at least one of the third switching element 203 and the fourth switching element 204 overheats. The control circuit part 40 then stops the switching operations of all the switching elements 201 to 206.

Figure 5:
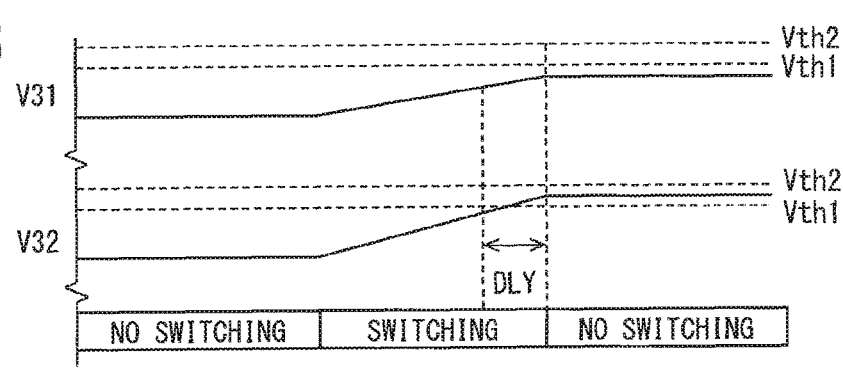
FIG. 5 is a time chart showing a detection result of each temperature sensor and a processing operation of the control circuit part in a case of overheating of a W-phase in the embodiment.

When the detection signal V32 of the second temperature sensor 32 exceeds the first threshold value Vth1 but the detection signal of the first temperature sensor 31 does not exceed the first threshold value Vth1 as shown in FIG. 5, the control circuit part 40 determines that the third phase part 20c overheats. The control circuit part 40 determines that at least one of the fifth switching element 205 and the sixth switching element 206 overheats. The control circuit part 40 then stops the switching operations of all the switching elements 201 to 206.

Figure 6:
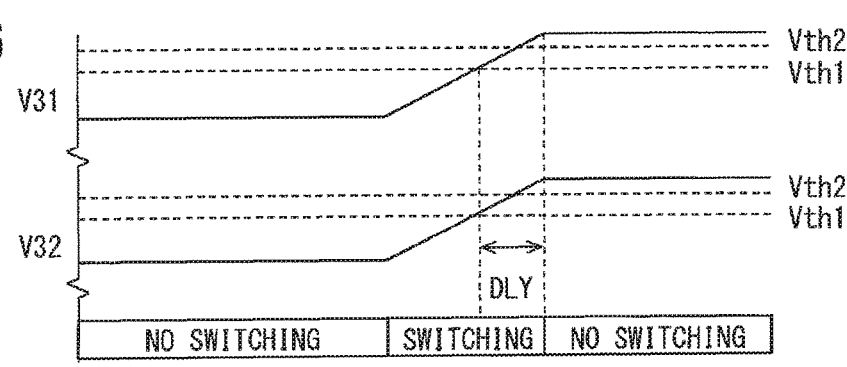
FIG. 6 is a time chart showing a detection result of each temperature sensor and a processing operation of the control circuit part in a case of overheating of all three phases in the embodiment.

When both of the detection signals V31 and V32 of the first temperature sensor 31 and the second temperature sensor 32 exceed the second threshold value Vth2 as shown in FIG. 6, the control circuit part 40 determines that all of the first phase part 20a, the second phase part 20b and the third phase part 20c overheat. That is, the control circuit part 40 determines that at least one of the first switching element 201 and the second switching element 202, at least one of the third switching element 203 and the fourth switching element 204 and at least one the fifth switching element 205 and the sixth switching element 206 overheat. The control circuit part then stops the switching operations of all the switching elements 201 to 206.

The control circuit part 40 may store information, which indicates the phase of overheat, in a memory after specifying the phase of overheat as described above. With this information, the electronic circuit device 100 can be subjected to easy debugging of inverter control. Further, a failure part may be easily specified by diagnosis function and maintenance of the electronic circuit device 100 can be simplified.

As described above, the temperature of each phase of the electronic circuit device 100 can be detected, although only the number of temperature sensors are two, that is, the first temperature sensor 31 and the second temperature sensor 32, relative to the three phases, which are the first phase part 20a, the V-phase part 20n and the third phase part 20c. That is, the phase part of overheat, that is, overheating phase can be determined with the temperature sensors, which are less in number than the phases of the electronic circuit device 100. That is, since the phase part of overheat among all of the phase parts 20a to 20c is determined based on all of the detection signals in the electronic circuit device 100, the phase part of overheat can be determined with a decreased number of temperature sensors.

In comparison to a case, in which a temperature sensor is provided individually for each phase or each switching element 201 to 206, the electronic circuit device 100 is provided with a decreased number of temperature sensors and in low costs. The overheated switching element 201 to 206 is prevented from being continuously driven in the electronic circuit device 100, while reducing costs of temperature sensors.

The electronic circuit device 100 is not limited to the preferred embodiment described above but may be implemented with a variety of modifications. Plural modifications of the embodiment will be described below. The embodiment described above and the following modifications thereof may be implemented individually or in appropriate combinations.

First Modification

An electronic circuit device 110 according to a first modification is different from the electronic circuit device 100 described above in that, as shown in FIG. 7, an output part 21 is configured differently and a third temperature sensor 33 is provided additionally. In this modification, reference numerals 20a, 20b and 20c refer to a first phase part, a second phase part and a third phase part, respectively. The first phase part 20a to the third phase part 20c as well as the first temperature sensor 31 and the second temperature sensor 32 are configured similarly as in the first embodiment.

Figures 7, 8:
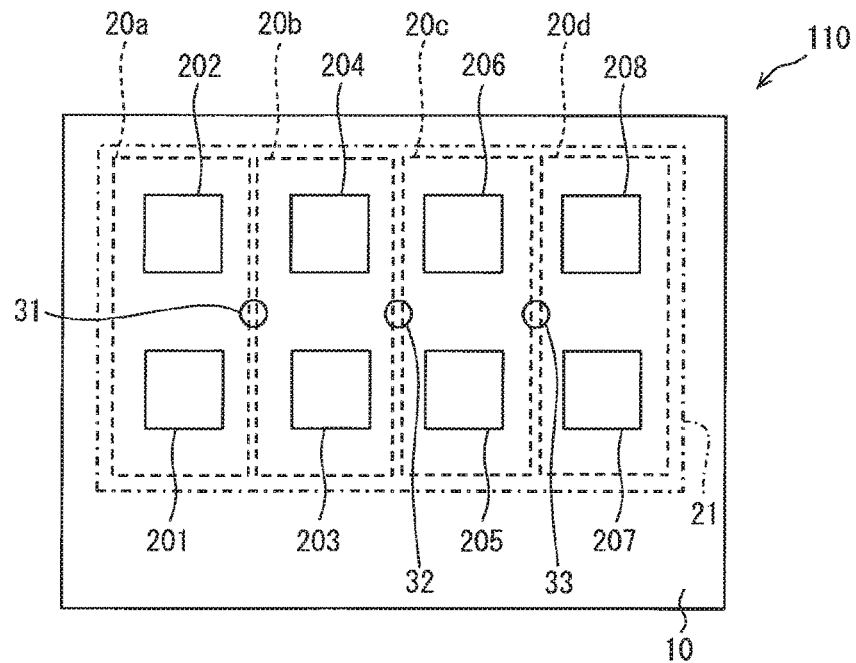
FIG. 7 is a plan view showing a general configuration of an electronic circuit device according to a first modification of the embodiment.
FIG. 8 is a table, which is used to specify a phase of overheating in the first modification of the embodiment.

The output part 21 includes a fourth phase part 20d in addition to the first phase part 20a to the third phase part 20c. That is, the output part 21 includes four phase parts differently from the output part 20. The fourth phase part 20d is connected in parallel to the first phase part 20a to the third phase part 20c. The fourth phase part 20d is formed of a seventh switching element 207 and an eighth switching element 208 as switching elements of a low-side arm and a high-side arm, respectively. The fourth phase part 20d is configured similarly to the first phase part 20a. That is, as shown in FIG. 7, the seventh switching element 207 and the eighth switching element 208 are configured and located similarly to the first switching element 201 and the second switching element 202, respectively. Further the fourth phase part 20d is arranged in parallel with the first phase part 20a to the third phase part 20c one another.

The third temperature sensor 33 outputs a detection signal, which corresponds to temperature developed between the third phase part 20c and the fourth phase part 20d, to the control circuit part 40 as a detection result in the similar manner as the first temperature sensor 31 and the second temperature sensor 32. The third temperature sensor 33 is mounted on the same surface of the mounting substrate 10, on which the first temperature sensor 31 and the second temperature sensor 32 are mounted.

The electronic circuit device 110 is provided with only three temperature sensors 31 to 33, which are less in number than the four phases of the first phase part 20a to the fourth phase part 20d. The electronic circuit device 110 is thus configured to form an example that the number of phases of the output part 20 is n=4 and the number of the temperature sensors is m=n−1.

The third temperature sensor 33 is located at a position, which is distanced equally from the fifth switching element 205 to the eighth switching element 208. That is, the third temperature sensor 33 is located at a center of an area surrounded by the fifth switching element 205 to the eighth switching element 208. This area is defined by corners of the fifth switching element 205 and the eighth switching element 208 closest to each other and corners of the sixth switching element 206 and the seventh switching element 207 closest to each other. That is, the third temperature sensor 33 is located at a position which is equally distanced from the closest corners of the fifth switching element 205 to the eighth switching element 208.

The control circuit part 40 drives each switching element 202 to 208 to perform a switching operation. The control circuit part 40 specifies a phase part of overheat among the first phase part 20a to the fourth part 20d as shown in FIG. 8 based on the detection signals outputted by the first temperature sensor 31 to the third temperature sensor 33.

It is not likely that only two or three phases of the four phases of the electronic circuit device 110 simultaneously fail. Accordingly, in the first modification, two overheat cases are assumed. Only one of the four phases is assumed to fail in one overheat case and all of the four phases are assumed to fail in the other overheat case.

Since the third temperature sensor 33 is located at the position sandwiched by the third phase part 20c and the fourth phase part 20d, it is more affected by heat generation of the third phase part 20c and the fourth phase part 20d than by heat generation of the first phase part 20a and the second phase part 20b. As a result, the third temperature sensor 33 tends to output the detection signal, which corresponds to heat generation of the third phase part 20c and the fourth phase part 20d more than heat generation of the first phase part 20a and the second phase part 20b. The first temperature sensor 31 and the second temperature sensor 32 tend to output the detection signals, which correspond to heat generation of the first phase to the third phase as described above.

For this reason, when the detection signal V31 of the first temperature sensor 31 exceeds the first threshold value Vth1 but the detection signals V32 and V33 of the second temperature sensor 32 and the third temperature sensor 33 do not exceed the first threshold value Vth1 as shown in FIG. 8, the control circuit part 40 determines that the first phase part 20a overheats. The control circuit part 40 determines that at least one of the first switching element 201 and the second switching element 202 overheats. The control circuit part 40 then stops the switching operations of all the switching elements 201 to 208.

When the detection signals V31 and V32 of both of the first temperature sensor 31 and the second temperature sensor 32 exceed the first threshold value Vth1 but the detection signal V33 of the third temperature sensor 33 does not exceed the first threshold value Vth1, the control circuit part 40 determines that the second phase part 20b overheats. The control circuit part 40 determines that at least one of the third switching element 203 and the fourth switching element 204 overheats. The control circuit part 40 then stops the switching operations of all the switching elements 201 to 208.

When the detection signals V32 and V33 of the second temperature sensor 32 and the third temperature sensor 33 exceed the first threshold value Vth1 but the detection signal V31 of the first temperature sensor 31 does not exceed the first threshold value Vth1, the control circuit part 40 determines that the third phase part 20c overheats. The control circuit part 40 determines that at least one of the fifth switching element 205 and the sixth switching element 206 overheats. The control circuit part 40 then stops the switching operations of all the switching elements 201 to 208.

When the detection signals V31 and V32 of the first temperature sensor 31 and the second temperature sensor 32 do not exceed the first threshold value Vth1 but the detection signal V33 of the third temperature sensor 33 exceeds the first threshold value Vth1, the control circuit part 40 determines that the fourth phase part 20d overheats. The control circuit part 40 determines that at least one of the seventh switching element 207 and the eighth switching element 208 overheats. The control circuit part 40 then stops the switching operations of all the switching elements 201 to 208.

When all the detection signals V31, V32 and V33 of the first temperature sensor 31 to the third temperature sensor 33 exceed the second threshold value Vth2, the control circuit part 40 determines that all of the first phase part 20a to the fourth phase part 20d overheat. That is, the control circuit part 40 determines that at least one of the first switching element 201 and the second switching element 202, at least one of the third switching element 203 and the fourth switching element 204 and at least one the fifth switching element 205 and the sixth switching element 206 overheat. In addition, the control circuit part 40 further determines that at least one of the seventh switching element 207 and the eighth switching element 208 overheats. The control circuit part 40 then stops the switching operations of all the switching elements 201 to 208.

As described above, the electronic circuit device 110 provides the similar advantage as the electronic circuit device 100. The electronic circuit device 110 provides the similar advantages as described above even in a case of five phases (n=5) and n−1 pieces of temperature sensors.

Second Modification

Figure 9:
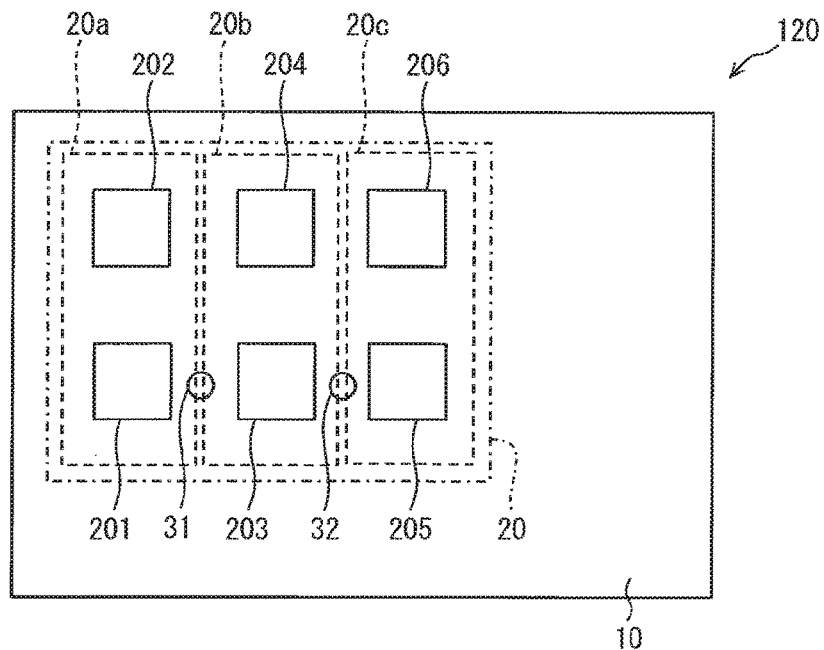
FIG. 9 is a plan view showing a general configuration of an electronic circuit device according to a second modification of the embodiment.

An electronic circuit device 120 according to a second modification is different from the electronic circuit device 100 described above in that, as shown in FIG. 9, the first temperature sensor 31 and the second temperature sensor 32 are provided at positions different from the positions in the electronic circuit device 100. In the electronic circuit device 120, the switching elements 201, 203 and 205 in the low-side arms are assumed to generate more heat than the switching elements 202, 204 and 206 in the high-side arms do. That is, temperature rise is larger in the low-side arms than in the high-side arms.

The first temperature sensor 31 is located between the first switching element 201 and the third switching element 203. The first temperature sensor 31 is located at a position equally distanced from the first switching element 201 and the third switching element 203. That is, the first temperature sensor 31 is located at a center of an area between the first switching element 201 and the third switching element 203. The first temperature sensor 31 is located at a position equally distanced from the switching elements 201 and 203 of two phase parts 20a and 20b, each of which is adjoining to the first temperature sensor 31.

The second temperature sensor 32 is located between the third switching element 203 and the fifth switching element 205. The second temperature sensor 32 is located at a position equally distanced from the third switching element 203 and the fifth switching element 205. That is, the second temperature sensor 32 is located at a center of an area between the third switching element 203 and the fifth switching element 205. The second temperature sensor 32 is located at a position equally distanced from the switching elements 203 and 205 of two phase parts 20b and 20c, each of which is adjoining to the second temperature sensor 32. The second temperature sensor 32 is located closer to the third switching element 203 and the fifth switching element 205 than it is to the fourth switching element 204 and the sixth switching element 206.

The electronic circuit device 120 provides the similar advantage as the electronic circuit device 100. Since the first temperature sensor 31 and the second temperature sensor 32 are located between the low-side arms and not between the high-side arms of the adjoining phases in the electronic circuit device 120, the first temperature sensor 31 and the second temperature sensor 32 can detect temperatures with high sensitivity.

In a case that, the switching elements 202, 204 and 206 in the high-side arms are assumed to generate more heat than the switching elements 201, 203 and 205 in the low-side arms do in the electronic circuit device 120, the first temperature sensor 31 and the second temperature sensor 32 are located preferably between the high-side arms. In this case, the first temperature sensor 31 is located at a position equally distanced from the second switching element 202 and the fourth switching element 204. The second temperature sensor 32 is located at a position equally distanced from the fourth switching element 204 and the sixth switching element 206.

The electronic circuit device 120 may be provided with the fourth phase part 20d similarly to the first modification. In this case, the third temperature sensor 33 is located between the fifth switching element 205 and the seventh switching element 207 in the low-side arms in the electronic circuit device 120. Alternatively, the third temperature sensor 33 may be located between the sixth switching element 206 and the eighth switching element 208 in the high-side arms in the electronic circuit device 120.

Third Modification

Figure 10:
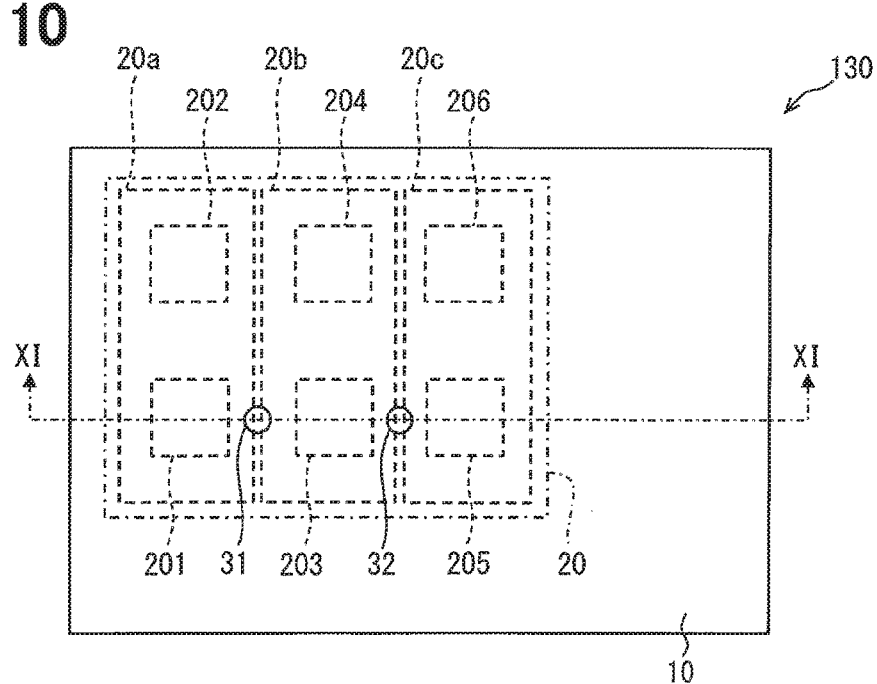
FIG. 10 is a plan view showing a general configuration of an electronic circuit device according to a third modification of the embodiment.
Figure 11:
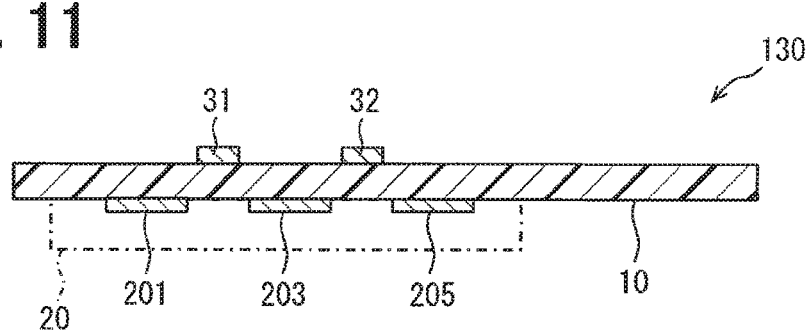
FIG. 11 is a sectional view showing a cross-section taken along a line XI-XI in FIG. 10.

An electronic circuit device 130 according to a third modification is different from the electronic circuit device 100 in that, as shown in FIG. 10 and FIG. 11, the switching elements 201 to 206 and the temperature sensors 31 and 32 are mounted on different mounting surfaces of the mounting substrate 10. That is, as shown in FIG. 11, the switching elements 201 to 206 are mounted on one surface of the mounting substrate 10 and the temperature sensors 31 and 32 are mounted on the other surface of the mounting substrate 10 in the electronic circuit device 130.

The electronic circuit device 130 provides the similar advantage as the electronic circuit device 100. The third modification may be implemented similarly in the first modification and the second modification.

Fourth Modification

Figure 12:
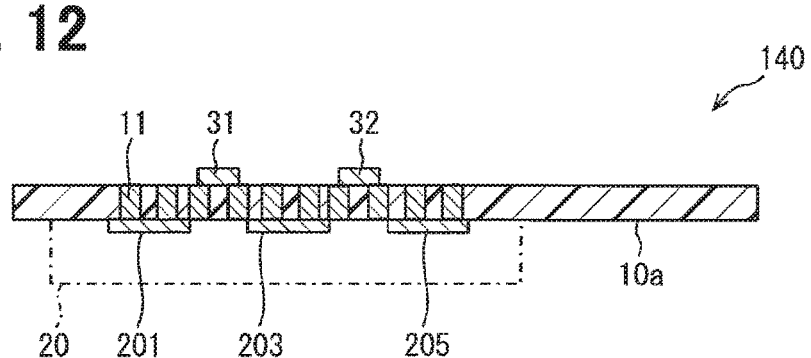
FIG. 12 is a sectional view showing a general configuration of an electronic circuit device according to a fourth modification of the embodiment.

An electronic circuit device 140 according to a fourth modification is different from the electronic circuit device 130 in that, as shown in FIG. 12, a mounting substrate 10a is provided with thermal vias 11. For example, the thermal vias 11 are formed in areas facing the switching elements 201 to 206 and areas facing surrounding areas of the switching elements 201 to 206. Each of the thermal vias 11 is a conductive member passing through the mounting substrate 10 from one surface to the other surface. The thermal vias 11 are not electrically connected to the switching elements 201 to 206 nor the temperature sensors 31 and 32.

The electronic circuit device 140 provides the similar advantage as the electronic circuit device 130. The electronic circuit device 140 thus promotes transfer of heat generated by the switching elements 201 to 206 to the temperature sensors 31 and 32 more than the electronic circuit device 130. For example, the electronic circuit device 140 easily transfers the heat generated by the first switching element 201 and the second switching element 202 to the first temperature sensor 31. The electronic circuit device 140 thus improves sensitivity of temperature detection than the electronic circuit device 130. The electronic circuit device 140 further separates switching wiring and large current wiring, which generate noise voltages, from temperature detection voltage wiring, which transfers the detection signals from the temperature sensors 31 and 32 to the control circuit part 40, by surface spacing. The fourth modification may be implemented in the first modification and the second modification as well.

Fifth Modification

Figure 13:
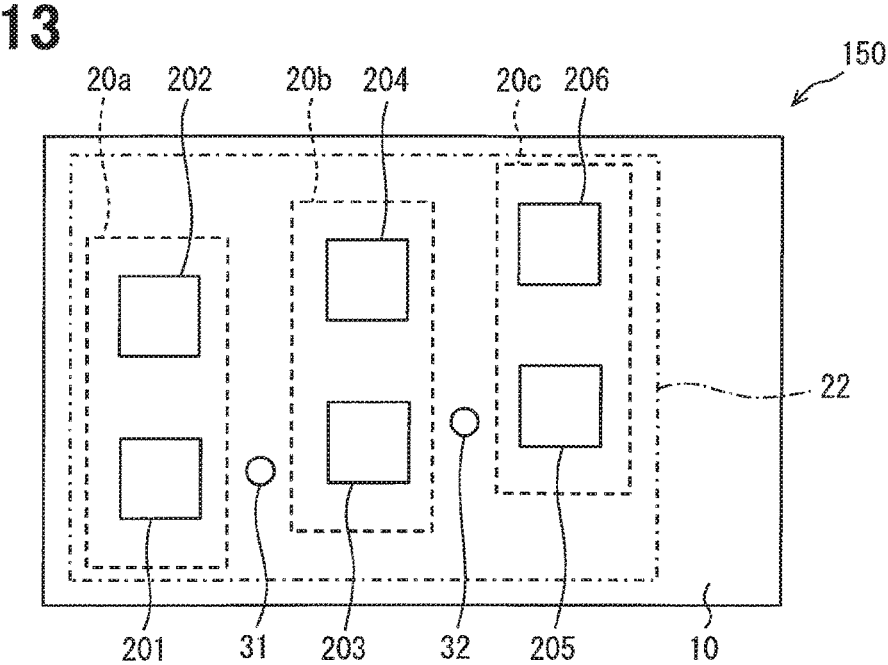
FIG. 13 is a plan view showing a general configuration of an electronic circuit device according to a fifth modification of the embodiment.

An electronic circuit device 150 according to a fifth modification is different from the electronic circuit device 120 in that, as shown in FIG. 13, an output part 22 is configured differently.

The output part 22 is different in that the phase parts 20a to 20c are located at different positions from the output part 20. The phase parts 20a to 20b in the output part 22 correspond to those in the output part 20 and hence indicated with the same reference numerals.

In the output part 22, a distance between the first phase part 20a and the second phase part 20b and a distance between the second phase part 20b and the third phase part 20c are different. That is, in the output part 22, a distance between the first temperature sensor 31 and the first switching element 201 and a distance between the first temperature sensor 31 and the third switching element 203 are equal. Further, in the output part 22, a distance between the second temperature sensor 32 and the third switching element 203 and a distance between the second temperature sensor 32 and the fifth switching element 205 are equal. However, in the output part 22, the distance between the first temperature sensor 31 and the first switching element 201 and the distance between the second temperature sensor 32 and the third switching element 203 are different.

Further, in the output part 22, the phase parts 20a to 20c are located at positions shifted in a direction of arrangement of the first switching element 201 and the second switching element 202 one another. That is, in the output part 22, side surfaces of the third switching element 203 and the fourth switching element 204 facing each other are shifted from two imaginary lines passing side surfaces of the first switching element 201 and the second switching element 202 facing each other, for example. Similarly in the output part 22, the third phase part 20c is located at a position shifted from the second phase part 20b.

The electronic circuit device 150 provides the similar advantage as the electronic circuit device 120 does. The fifth modification may be implemented in any one of the first modification and the third modification as well.

Sixth Modification

Figure 14:
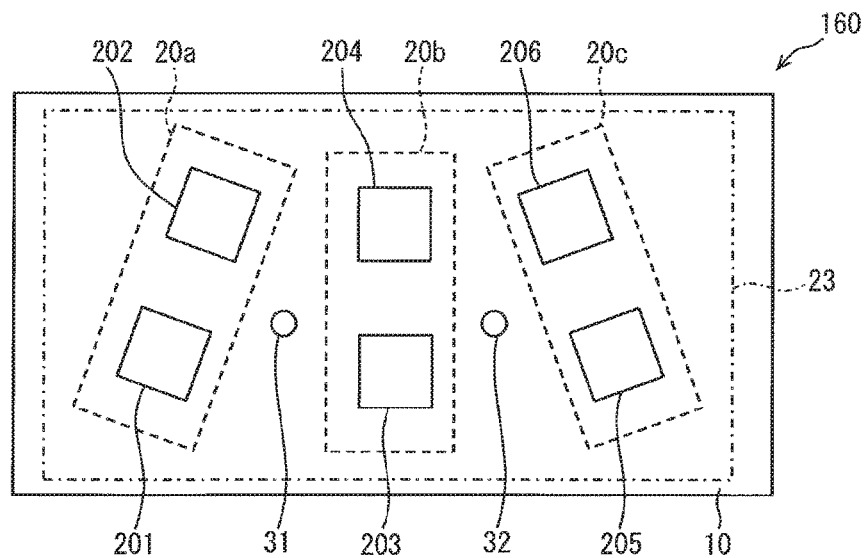
FIG. 14 is a plan view showing a general configuration of an electronic circuit device according to a sixth modification of the embodiment.

An electronic circuit device 160 according to a sixth modification is different from the electronic circuit device 100 in that, as shown in FIG. 14, an output part 23 is configured differently.

In the output part 23, the phase parts 20a to 20c are not arranged in parallel. In the output part 23, the first phase part 20a and the third phase part 20c are arranged to incline relative to the second phase part 20b. The phase parts 20a to 20c in the output part 23 are similar to those in the output part 20 and hence indicated with the same reference numerals.

The electronic circuit device 160 provides the similar advantage as the electronic circuit device 100. The sixth modification may be implemented in any one of the first modification to the fourth modification as well.

Seventh Modification

Figure 15:
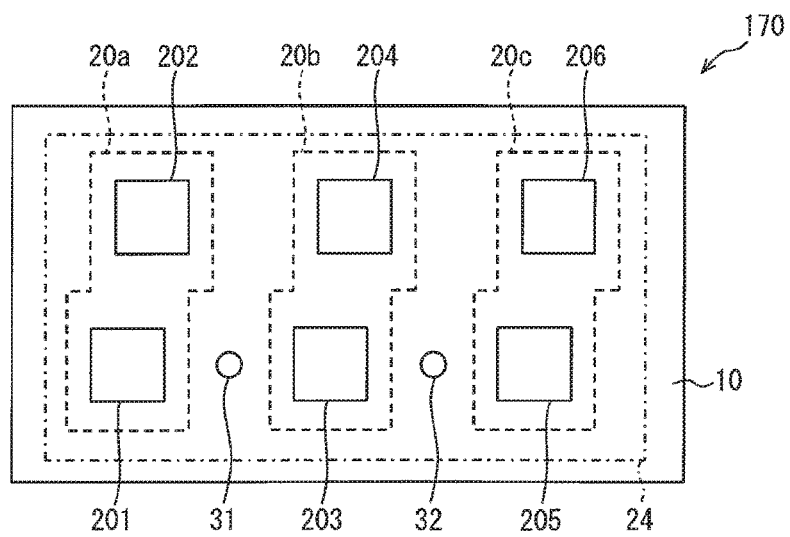
FIG. 15 is a plan view showing a general configuration of an electronic circuit device according to a seventh modification of the embodiment.

An electronic circuit device 170 according to a seventh modification is different from the electronic circuit device 100 in that, as shown in FIG. 15, an output part 24 is configured differently.

The output part 24 is different from the output part 20 in that the switching elements 201 to 206, which are indicated with the same reference numerals as in the output part 20, are located at different positions from those in the output part 20. In the first phase part 20a, the first switching element 201 and the second switching element 202 are not located along one imaginary straight line. In the second phase part 20b, the third switching element 203 and the fourth switching element 204 are not located along one imaginary straight line. In the third phase part 20c, the fifth switching element 205 and the sixth switching element 206 are not located along one imaginary straight line. The switching elements 201 to 206 in the output part 24 are different from those in the output part 20 in respect to locations of arrangement.

The electronic circuit device 170 provides the similar advantage as the electronic circuit device 100. The seventh modification may be implemented in the first modification to the sixth modification as well.

Eighth Modification

Figure 16:
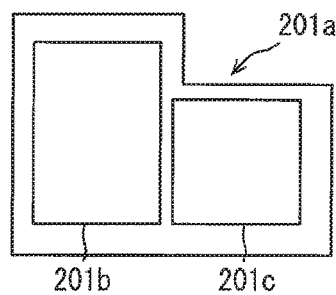
FIG. 16 is a plan view showing a general configuration of a switching element in an eighth modification of the embodiment.
Figure 17:
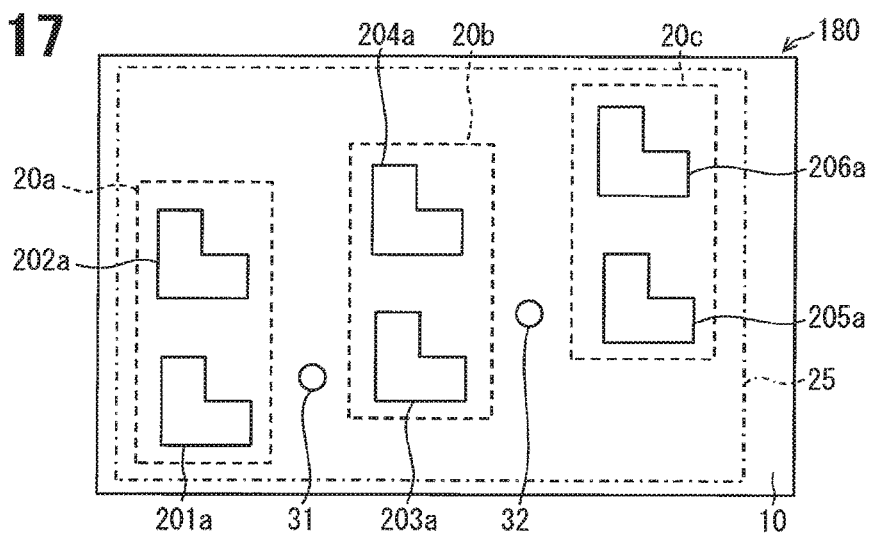
FIG. 17 is a plan view showing a general configuration of an electronic circuit device according to an eighth modification of the embodiment.

An electronic circuit device 180 according to an eighth modification is different from the electronic circuit device 170 in that, as shown in FIG. 16 and FIG. 17, each of switching elements 201a to 206a is configured differently from that of the electronic circuit device 170.

Each switching element 201a to 206a has the same configuration. For this reason, the first switching element 201a is described in detail as one example. As shown in FIG. 16, the first switching element 201a is a discrete component, in which an IGBT 201b and an FWD 201c are formed individually. The first switching element 201a has a surface shape, which is different from that of the first switching element 201 and not a rectangular shape. The surface shape of the first switching element 201a is an L-shape.

The electronic circuit device 180 is provided with an output part 25. The output part 25 is formed of the first phase part 20a, the second phase part 20b and the third phase part 20c. The first phase part 20a includes the first switching element 201a and the second switching element 202a. The second phase part 20b includes the third switching element 203a and the fourth switching element 204a. The third phase part 20c includes the fifth switching element 205a and the sixth switching element 206a.

The electronic circuit device 180 provides the similar advantages as the electronic circuit device 100. The eighth modification may be implemented in any one of the first modification to the sixth modification.

Ninth Modification

Figure 18:
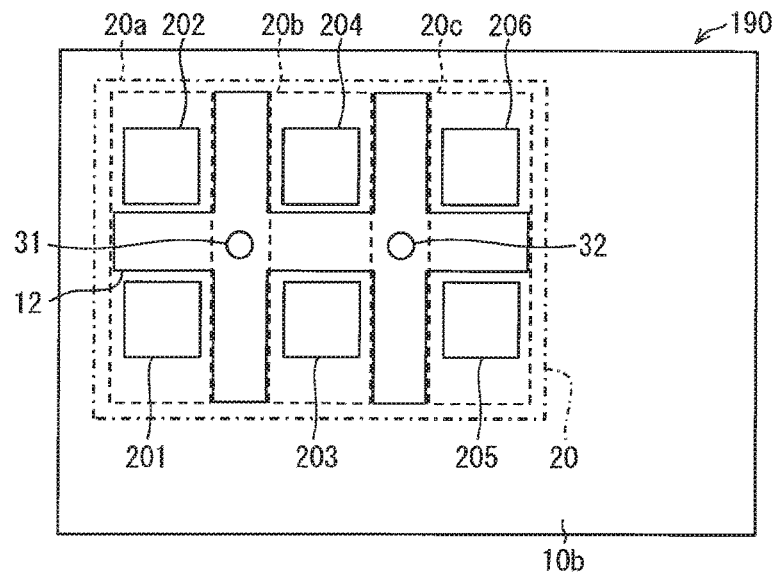
FIG. 18 is a plan view showing a general configuration of an electronic circuit device according to a ninth modification of the embodiment.

An electronic circuit device 190 according a ninth embodiment is different from the electronic circuit device 100 in that, as shown in FIG. 18, a dummy wiring 12 is formed on a mounting substrate 10.

The dummy wiring 12 formed on the mounting substrate 10b is not electrically connected to the switching elements 201 to 206 nor the temperature sensors 31 and 32. The dummy wiring 12 is formed of a conductive member such as Cu or Au as a main component.

The dummy wiring 12 is formed on the same surface of the mounting substrate 10b as the switching elements 201 to 206 and the temperature sensors 31 and 32 are mounted. The dummy wiring 12 is provided among the phase parts 20a to 20c and between the high-side arm and the low-side arm. That is, the dummy wiring 12 is provided between the first switching element 201 and the second switching element 202, between the third switching element 203 and the fourth switching element 204 and between the fifth switching element 205 and the sixth switching element 206. The dummy wiring 12 is provided further between the first switching element 201 and the third switching element 203 and between the third switching element 203 and the fifth switching element 205. The dummy wiring 12 is provided further between the second switching element 202 and the fourth switching element 204 and between the fourth switching element 204 and the sixth switching element 206. The dummy wiring 12 is provided further in an area surrounded by the first switching element 201 to the fourth switching element 204 and an area surrounded by the third switching element 203 to the sixth switching element 206. The dummy wiring 12 may be embedded in the mounting substrate 10b.

The electronic circuit device 190 provides the similar advantage as the electronic circuit device 100 does. The electronic circuit device 190 promotes transfer of heat generated by the switching elements 201 to 206 to the temperature sensors 31 and 32 more than the electronic circuit device 100 does. For example, the electronic circuit device 190 promotes transfer of heat generated by the first switching element 201 and the second switching element 202 to the first temperature sensor 31. The electronic circuit device 190 thus improves sensitivity of temperature detection more than the electronic circuit device 100. The ninth modification may be implemented in any one of the first modification to the eighth modification.

What is claimed is:

1. An electronic circuit device comprising:
    an output part including at least three phase parts, each of which is formed of two switching elements connected in series to turn on and off;
    temperature sensors for outputting detection signals corresponding to temperatures of the output part, the temperature sensors being less by one in number than the phase parts and located between adjoining two of the phase parts; and
    a control circuit part for specifying a phase part of overheat among all of the phase parts based on all of the detection signals.

2. The electronic circuit device according to claim 1, wherein:
    when the control circuit part specifies the phase part of overheat, the control circuit part controls the switching elements in the phase part of overheat to stop turning on and off.

3. The electronic circuit device according to claim 1, wherein:
    the control circuit part specifies the phase part of overheat by comparing the detection signals with a first threshold value and a second threshold value, which is larger than the first threshold value; and
    when only one of the detection signals exceeds the first threshold value, the control circuit part specifies, as the phase of overheat, the phase part, which adjoins to the temperature sensor outputting the detection signal exceeding the first threshold value and which is not sandwiched between the temperature sensor outputting the detection signal exceeding the first threshold value and the temperature sensor different from the temperature sensor outputting the detection signal exceeding the first threshold value.

4. The electronic circuit device according to claim 3, wherein:

when two of the detection signals exceed the first threshold value and do not exceed the second threshold value, the control circuit part specifies, as the phase part of overheat, the phase part, which are sandwiched between the two of the temperature sensors outputting the detection signals exceeding the first threshold value.

5. The electronic circuit device according to claim 3, wherein:

when all of the detection signals exceed the second threshold value, the control circuit part specifies that all of the phase parts overheat.

6. The electronic circuit device according to claim 1, wherein:

each of the temperature sensors is located at a position equally distanced from all of the switching elements, which are in two of the phase parts adjoining to the each of the temperature sensors.

7. The electronic circuit device according to claim 1, wherein:

each of the temperature sensors is located at a position equally distanced from one of the switching elements in each of two of the output parts, which are adjoining to the each of the temperature sensors.

8. The electronic circuit device according to claim 1, further comprising:

a mounting substrate mounting thereon the switching elements and the temperature sensors.

9. The electronic circuit device according to claim 8, wherein:

the switching elements are mounted on one surface of the mounting substrate;

the temperature sensors are mounted on an other surface of the mounting substrate, which is opposite to the one surface; and the mounting substrate has thermal vias, which pass through the mounting substrate from the one surface to the other surface, in an area between the switching elements.

10. The electronic circuit device according to claim 8, wherein:

the mounting substrate has a dummy wiring, which includes a conductive material as a main component, between the switching elements.

11. The electronic circuit device according to claim 1, wherein:

the at least three phase parts are a first phase part, a second phase part and a third phase part;

the temperature sensors are a first temperature sensor and a second temperature sensor;

the first temperature sensor is located between the first phase part and the second phase part; and the second temperature sensor is located between the second phase part and the third phase part.

* * * * *